United States Patent

Reiter

[15] 3,665,828
[45] May 30, 1972

[54] BACKGROUND PHOTOGRAPHY

[72] Inventor: Josef Reiter, 175 Sherbrooke Street West, Montreal, Quebec, Canada

[22] Filed: June 1, 1970

[21] Appl. No.: 42,337

[52] U.S. Cl. ...................................95/11 R, 95/66, 95/83
[51] Int. Cl. ..........................................G03b 15/10
[58] Field of Search ....................95/65, 66, 82, 83; 355/40, 355/19, 43; 91/1; 352/48, 85, 88, 90, 97

[56] References Cited

UNITED STATES PATENTS

| 3,331,298 | 7/1967 | Wiggins et al. | 95/1 |
| 3,155,978 | 11/1964 | Seitz | 355/43 X |
| 1,764,490 | 6/1930 | Artigue | 352/48 |
| 393,642 | 11/1888 | Hansbury | 95/65 |
| 2,356,383 | 8/1944 | Clarke | 95/65 X |

Primary Examiner—Joseph F. Peters, Jr.
Attorney—Alan Swabey

[57] ABSTRACT

A camera including a device for mounting a transparency therein for movement from an operative position in intimate contact with the film to be exposed and an inoperative position clear of the film. A photographic method or system including double exposing the film with the first exposure being made with a transparency in intimate contact with the film by backlighting the object to be photographed to silhouette the object on the film and to expose the transparency onto the film except for the area silhouetted and then removing the transparency and moving a substantially nonreflecting backdrop into position behind the object and frontlighting the object for the second exposure. Where larger backgrounds are required, a reflecting mask having an opening through which the object to be photographed is viewed, is used and during the first exposure the object is backlit and light is reflected from the mask into the camera to expose the film through substantially all of the area covered by the transparency with the exception of the area silhouetted by the object to be photographed.

13 Claims, 10 Drawing Figures

Patented May 30, 1972
3,665,828
6 Sheets-Sheet 1
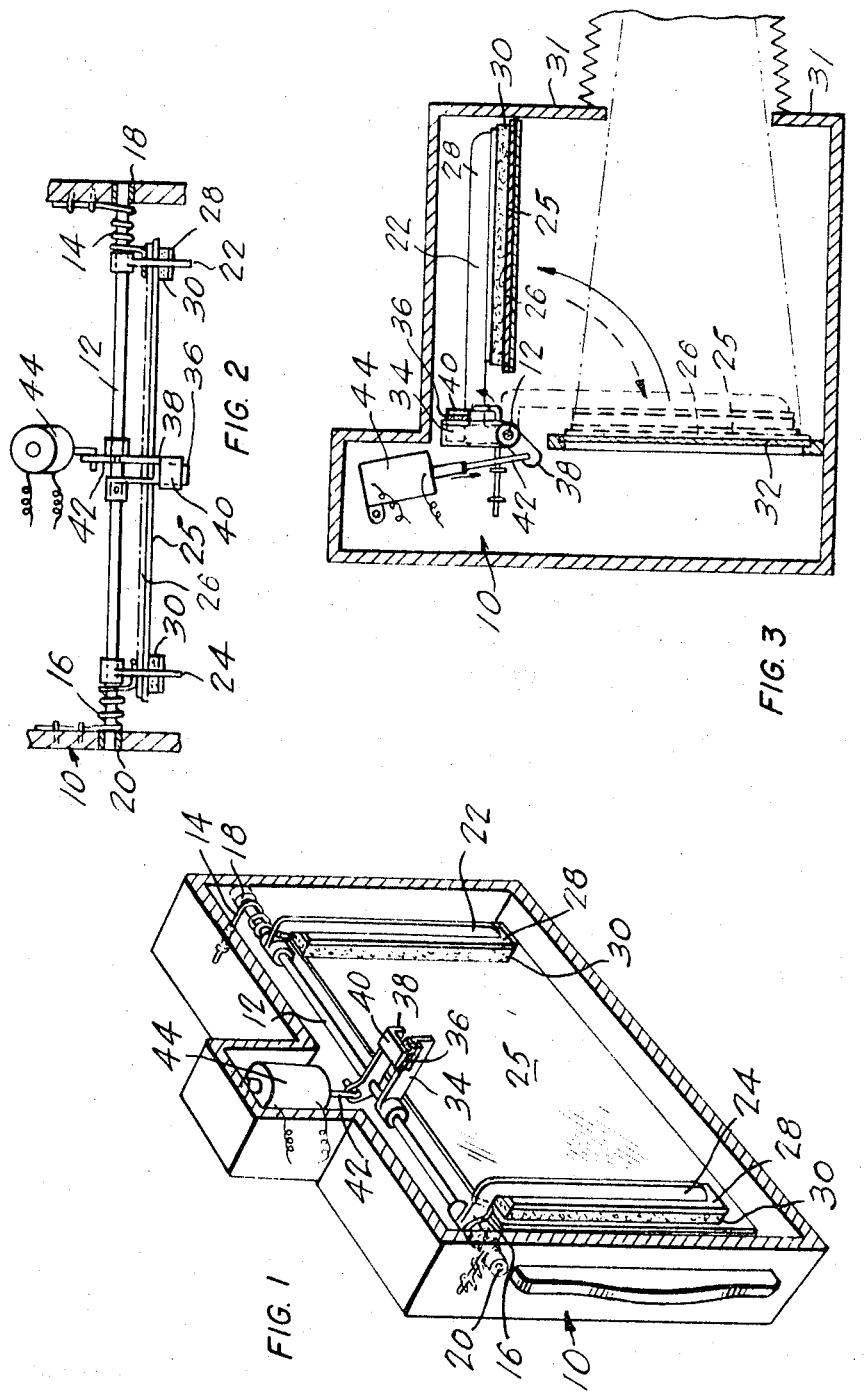
INVENTOR
Josef REITER
ATTORNEY Patented May 30, 1972

INVENTOR
Josef REITER

Alan Swabey
ATTORNEY

Patented May 30, 1972

INVENTOR
Josef REITER

Alan Swabey

ATTORNEY

Patented May 30, 1972

INVENTOR
Josef REITER

Alan Swabey
ATTORNEY

3,665,828

BACKGROUND PHOTOGRAPHY

BACKGROUND OF THE INVENTION

1. Field of the Invention

The present invention relates to photography. More particularly, the present invention relates to a method and apparatus of providing background to pictures.

2. Description of Prior Art

It has previously been proposed to use a transparency within a camera and to take a picture by first backlighting and then frontlighting the subject to expose the transparency to the film of the camera and then remove the transparency and again take a picture with the subject frontlighted. A device for doing this is illustrated in U.S. Pat. No. 3,331,298 which discloses a camera wherein a transparency is mounted in front of a negative and is adapted to slide from position by gravity into a receiver box positioned beneath the camera. This arrangement has many limitations that make it impractical for use and will result in lower quality pictures being produced.

SUMMARY OF THE INVENTION

It is a main object of the present invention to provide a system whereby an object may be photographed and positioned in a background without the use of an artificial base.

It is a further object of the present invention to provide a system wherein relatively large models or objects may be incorporated into appropriate background without requiring a maximum amount of space.

It is a further object of the present invention to provide an improved camera for taking such pictures.

Broadly, the present invention relates to a camera incorporating a transparency mounting means to pivotably move said transparency from a position in intimate contact with a film to a position clear of the lines of light transmission from the lens to the film.

The invention also relates to a system of photographing wherein a transparency is placed in intimate contact with a negative, the camera focused on a subject and the subject backlighted to expose the subject through the transparency onto the film, thereafter the transparency is moved to inoperative position, a non-reflective background is positioned behind the subject and the subject frontlighted when the background is positioned, thereby to properly expose the area of the film silhouetted by the object when backlit.

Yet a further form of the invention incorporates a mask reflector from which light is reflected back into the camera to expose the transparency onto the film at the same time as the subject is being backlighted to expose a portion of the film through an aperture in the reflector, the intensity of the light reflected from the mask is coordinated with that of the light passing through the mask to give a uniform exposure of the transparency onto the film in the first step of the operation.

BRIEF DESCRIPTION OF THE DRAWINGS

Further features, objects and advantages will be evident from the following detailed description of a preferred embodiment of the present invention taken in conjunction with the accompanying drawings in which:

FIG. 1 is a partial perspective view schematically illustrating one mode of adapting a camera to carry out the present invention;

FIG. 2 is a plan view of a mechanism shown in FIG. 1;

FIG. 3 is a schematic side elevation view illustrating the transparency in inoperative position;

DESCRIPTION OF PREFERRED EMBODIMENTS

Figure 4:
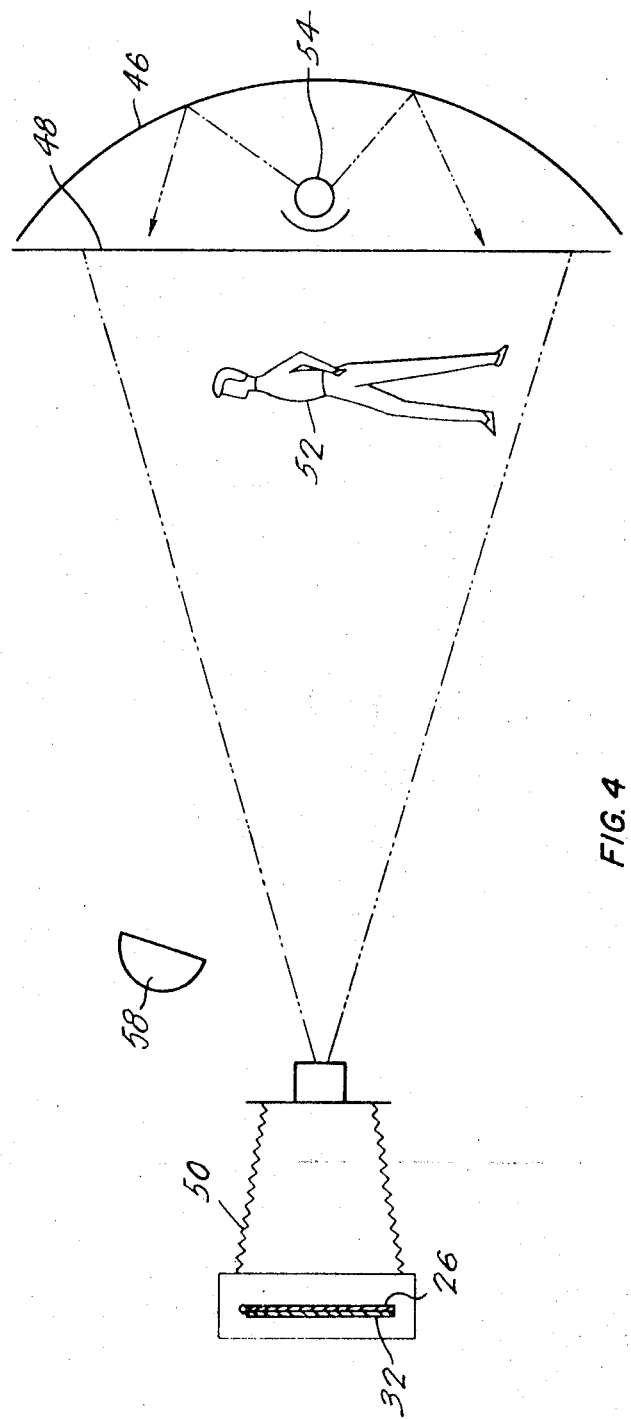
FIG. 4 is a schematic view illustrating one form of the invention showing the subject backlighted.

The camera will be first described with respect to FIGS. 1, 2 and 3. The illustrated camera includes a backing member 10 which generally will be a camera back with focusing glass adapted to slidably receive a film holder and hold same in position in the camera. This camera back 10 has been modified to include a shaft 12 which is spring biased to turn in a clockwise direction when viewed from the left end thereof by means of a pair of coil springs 14 and 16 one mounted at each opposite end of the shaft. The shaft is mounted in the bearings 18 and 20 in the sides of the camera back 10.

Fixedly mounted on the shaft 12 are a pair of L-shaped arms 22 and 24. These L-shaped arms on the longer arm of the L are provided with means for resiliently mounting the transparency 26 in position. Preferably, this resilient mounting means will take the form of a plate 28 fixed to each of the arms 22 and 24 and a foam rubber or the like strip 30 to which a transparent plate 25 such as a sheet of plexiglass is secured. The transparency 26 may be directly secured to the plate 25.

The springs 14 and 16 act on the shaft 12 to bias the arms 22 and 24 to the position shown in FIG. 1 and thereby hold the transparency 26 firmly against the film 32 indicated in dotted lines in FIG. 1 and shown in section in FIG. 3. The resilient strips 30 aid in permitting the transparency to be pressed substantially uniformly into intimate contact with the film 32.

Another lever 34 is fixed to the shaft 12 for rotation therewith. This lever 34 is provided with a foam rubber pad or bumper 36 which is adapted to be contacted by an abutment arm 40 on a lever 38 which is pivotably mounted on the shaft 12. The lever 38 is connected to the armature 42 of a solenoid 44 which, when actuated as illustrated in FIG. 1, forces the abutment 40 into contact with the pad 36 to pivot the shaft 12 and thus the arms 22 and 24 and the transparency 26 into position in intimate contact with the film 32. The solenoid 44 has been shown mounted above the film 32 but may be mounted at any suitable location inside or outside of the camera.

It can be seen from the above that when the solenoid 44 is actuated, the abutment 40 on the arm 38 contacts the pad or bumper 36 on the arm 34 and forces the arm 34 from a substantially vertical position to a substantially horizontal position, thereby moving the arms 22 and 24 from their retracted position illustrated in full lines in FIG. 3 to their operative position illustrated in FIG. 1 wherein the transparency 26 is in intimate contact with the film 32. The resilient strips 30 and the foam abutment pad 36 facilitate the intimate contacting of the film 32 by transparency 26 to ensure that the transparency is substantially at the focal point of the camera while permitting greater tolerance in the actuating mechanism and in the thicknesses of the transparency. Also, damage to the focusing glass is prevented when the transparency is lowered to operative position for focusing and positioning the model.

If the transparency is not properly positioned as described hereinabove, i.e. in intimate contact with the film, it will cause stray light between transparency and film and will result in a poor quality picture being produced.

Mounted within the camera in any suitable manner is a light trap 31. This light trap is a baffle or wall that substantially prevents light entering the camera from being reflected off of the transparency back onto the film thereby resulting in a poor picture being produced. In the illustrated arrangement, this light trap 31 is fixed directly to the camera and extends around the complete inner periphery thereof but, if desired, it would be connected to the plate 25 and be pivoted from a inoperative position to an operative position when the transparency 26 is in its operative and inoperative positions respectively. It also need not extend the full 360° depending on how the camera is to be operated and could, for example, be fixed to an arm connected to the camera back 10 and mounted in fixed relationship to the transparency when in inoperative position.

Figure 5:
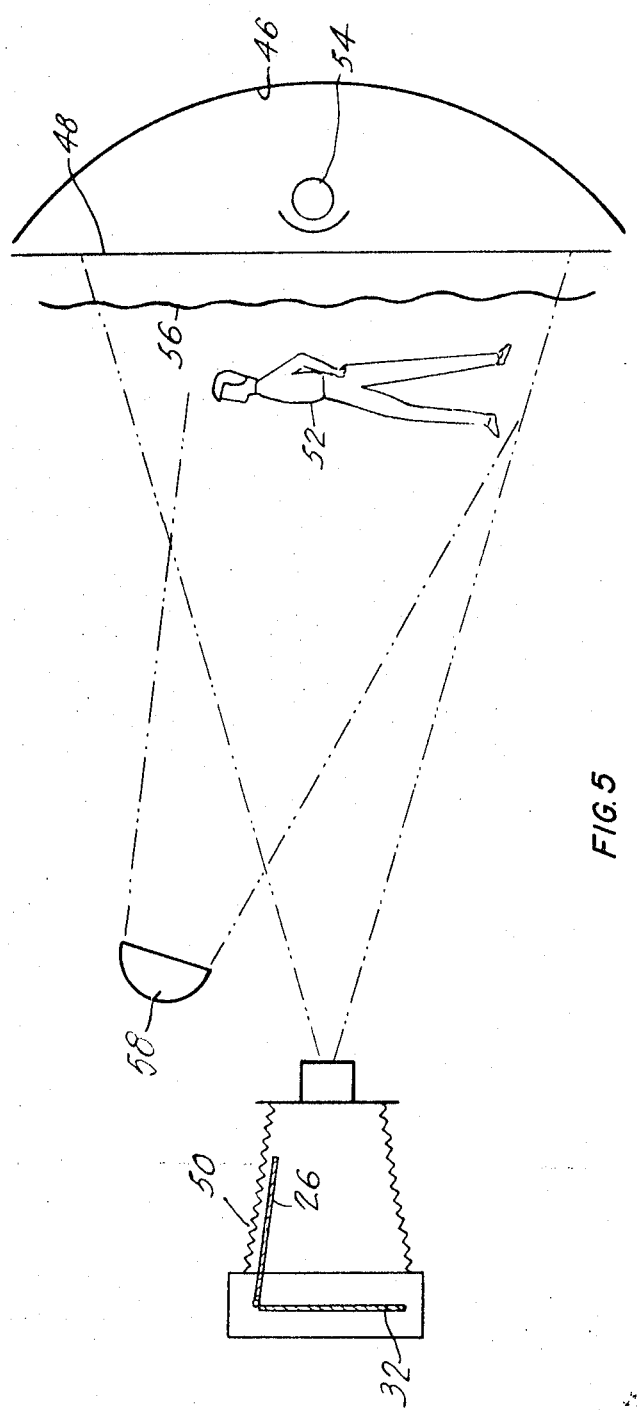
FIG. 5 is a view similar to FIG. 4 but showing the subject being frontlighted.

To operate the camera, a suitable backlighting device 46 provided with a translucent screen 48 is provided and the camera 50 focused on the model 52 positioned in front of the backlighting device 46 (see FIGS. 4 and 5). With the transparency 26 in intimate contact with the film 32, i.e. the solenoid actuated, the shutter of the camera may now be operated to open which will trigger the light 54 of the backlighting device 46 to backlight the model or subject 52 through the translucent screen 48 and expose the film 32 through the transparency 26 in the area not shadowed by the model 52.

The shutter operating mechanism may be provided with a further switch to disengage the solenoid 44 of the camera and permit the springs 14 and 16 to swing the transparency 26 to the position shown in FIG. 3 after the light 54 has been triggered. At the same time, the backdrop 56 which may be formed of any low light reflective material such as black velvet, etc., will be dropped into position between the object or model 52 and the transparent screen 48. As soon as the backdrop 56 is in position, the subject may be front-lighted by means of a flash or the like 58 and the film again exposed, this time with the object or model 52 frontlighted so that the area of the film previously silhouetted by the model 52 is now exposed.

Figure 6:
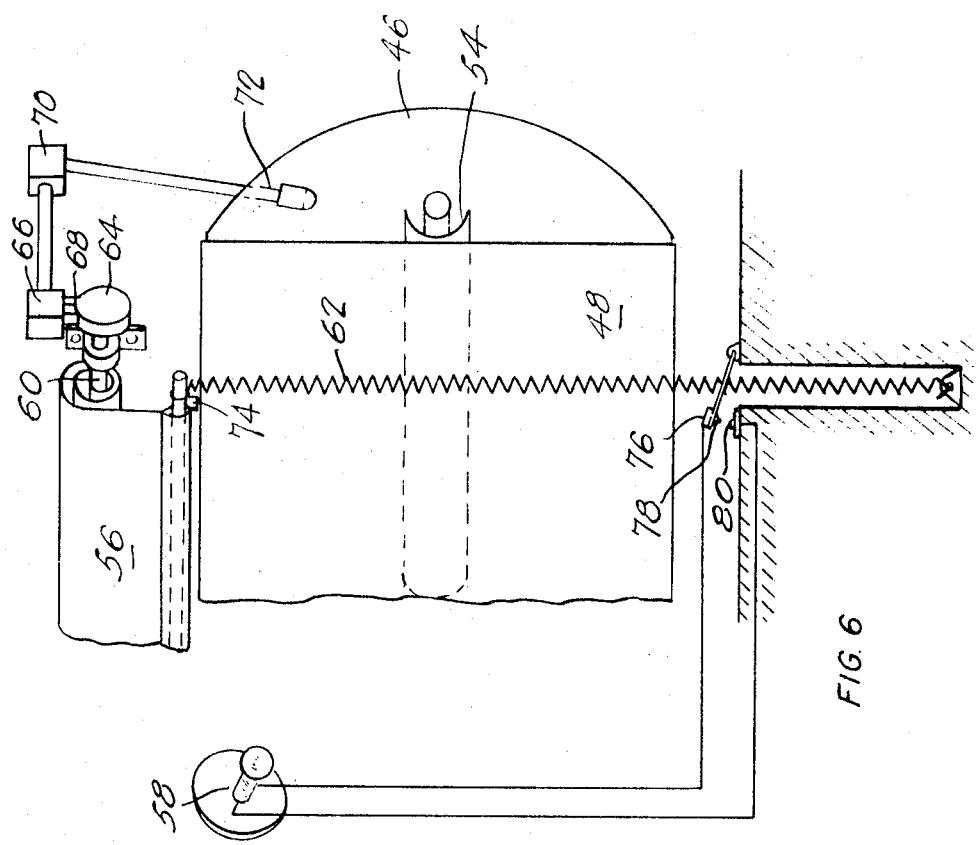
FIG. 6 is a schematic view illustrating control of the lighting and backdrop arrangement of the present invention.

To automatically position the backdrop 56 and the triggering of the frontlighting flash 58, suitable control means may be provided. One such control is illustrated in FIG. 6. In this arrangement, the backdrop 56 is shown as being mounted on a suitable rod 60 and being spring biased by a spring 62 to the lower position schematically shown in FIG. 5. A suitable catch mechanism which in the illustrated arrangement comprises a cam 64 and solenoid 66 having an armature 68 which normally interferes with the rotation of the rod or shaft 60 by interengagement of the armature 68 with the cam 64 to hold the backdrop 56 in raised position. The solenoid 66 is controlled by a suitable control switch 70 which in turn is controlled by a photoelectric controller 72 which senses the triggering of the flash 54 of the backlighting device 46 and actuates the solenoid 66 to release the backdrop 56.

Upon release of the backdrop 56 the spring 62 (there will be one spring 62 at each end of the backdrop) will quickly pull the backdrop down between the subject 52 and the translucent screen 48 and will move the abutment 74 suitably mounted on the bottom of the backdrop 56 into contact with a suitable pad or the like 76 on a switch contact 78 to force the switch contact 78 into contact with a mating contact 80 and complete the circuit to the frontlighting flash 58 to automatically actuate this flash as soon as the backdrop 56 is in position.

Figure 7:
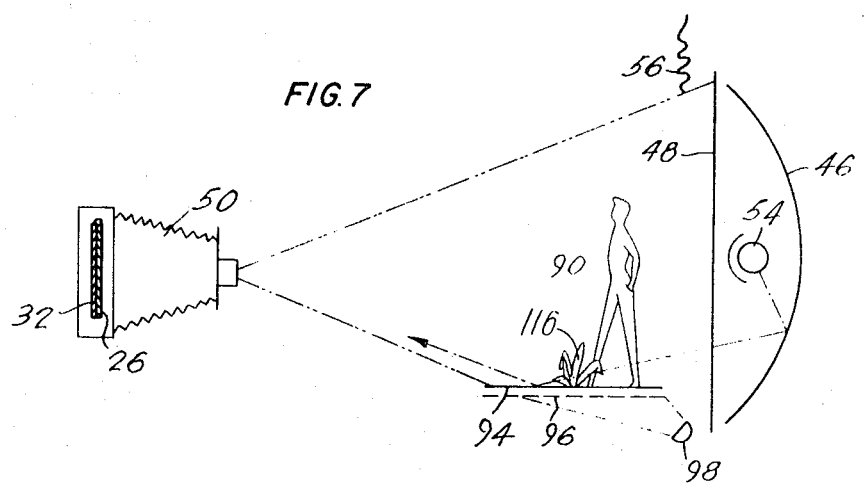
FIG. 7 is a view similar to FIG. 4 but showing special effects.

With the arrangement as described above, special effects may be obtained as desired, for example, as shown in FIG. 7. In this figure, the subject 90 is positioned on a suitable platform 94 which itself forms a decorative part of the scenery, i.e. in this case both the model 90 and the platform 94 will appear in the finished picture. The platform 94 is reflective and the light through the translucent screen 48 reflects from the platform 14 to expose the film 32 through an appropriate portion of the transparency 26. The final picture is taken in the manner described hereinabove with the backdrop 56 in position and the subject including the platform 94 frontlighted.

Other effects can be obtained, for example by changing the platform 94 for a translucent platform illustrated schematically in dot-dash lines at 96 in FIG. 7. The transparent platform 96 may be backlighted by a backlighting device 98 so that during the first exposure, certain areas of the film are exposed by light from source 98 through the translucent platform 96.

Figure 8:
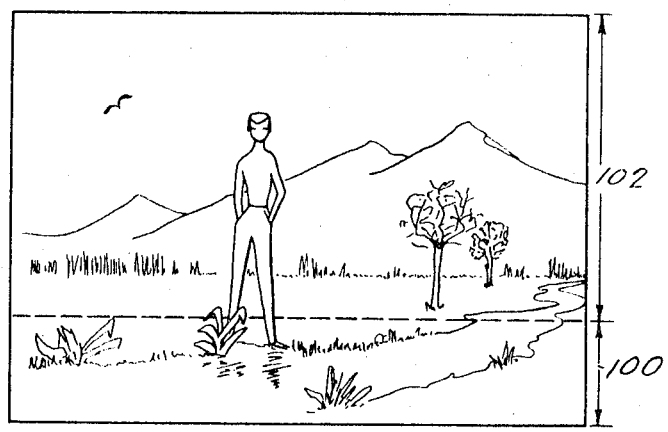
FIG. 8 illustrates a photograph that could be taken using the set up arrangement shown in FIG. 7.

A picture formed using the above described technique is illustrated in FIG. 8. The overall picture including the foreground 100 and background 102 is imparted to the film from the transparency 26. It will be noted that the model is positioned directly within the picture in both the foreground and background. By providing a prop such as the plant illustrated at 116 part of the model 90 may be hidden behind the prop which itself appears in the proper location in the picture thereby increasing the authenticity of the resultant picture.

Figure 9:
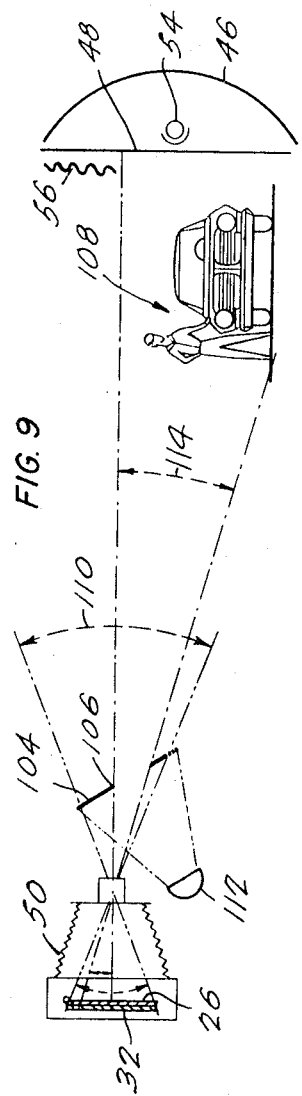
FIG. 9 is a schematic view illustrating the vignette reflector in operation.

The present invention also provides a system of enlarging the apparent size of the background. This system is schematically illustrated in FIG. 9 and includes a vignette reflector or mask 104 positioned in front of the camera 50 and adapted to reflect light back into the camera during the backlighting stage of the procedure. This vignette reflector or mask 104 is provided with an opening 106 through which the model or object 108 to be photographed is viewed by the camera.

The enclosed angle 110 is a composite angle based on the angle of the lens so that light reflected from the vignette reflector 104 will expose substantially the whole film 32 positioned behind the transparency 26. A suitable light source 112 directs light at the reflector 104 for reflection back into the camera.

The enclosed angle 114 as viewed through the opening 106 in the reflector 104 frames the object 108 and part of the translucent screen 48 so that the object may be backlighted during the first exposure of the film 32 wherein the procedure described is followed.

Thus, in operation, during the first exposure of the film 32 with the transparency 26 placed in intimate contact with the film, the shutter is opened and the lights 54 and 112 actuated to backlight the object 108 and to provide light for reflection back from the reflector 104 respectively to expose the whole of the transparency with the exception of the area silhouetted by the backlit object 108. The light reflected by the reflector 104 should have essentially the same intensity as the light passing through the opening 106 to ensure a substantially uniform exposure of the films 32 through the transparency 26. This is not too critical as any fringe lines between the reflected light from the source 112 and the backlighting means 46 will be softened due to the reflector 104 being out of focus.

Figure 10:
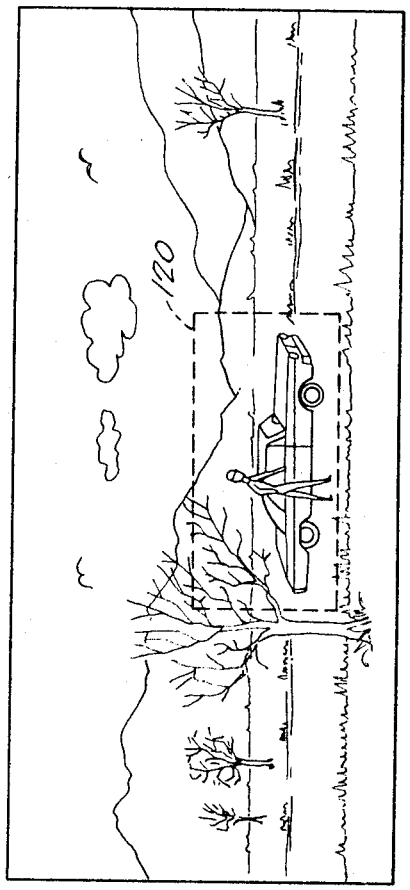
FIG. 10 is an illustration of a photograph that could be taken using the arrangement shown in FIG. 9.

As shown in FIG. 10, the substantial sized object may be photographed in a studio and yet placed into an environment of an appropriate size without requiring a relatively large area as would normally be required if conventional techniques were used. The area of the aperture 106 through which the object is photographed is illustrated by dotted lines 120.

The studio in which pictures are taken when using the present invention will normally be dark so that the shutter may be maintained open continuously through the flashing of the backlighting and frontlighting devices.

Having described the invention, modifications will be evident to those skilled in the art without departing from the spirit of the invention as defined in the appended claims.

I claim:

1. A camera comprising means for mounting a film in said camera, mounting means in said camera, means for connecting said mounting means to a transparency, means for pivotally mounting said mounting means in said camera, means for holding said transparency mounted on said mounting means in an operative position in intimate contact with said film, and means for moving said mounting means to move said transparency to an inoperative position clear of said film.

2. A camera as defined in claim 1 further comprising resilient means between said holding means and said transparency to take up excess movement of said holding means and positioning said transparency in intimate contact with said film.

3. A camera as defined in claim 2 wherein said resilient means are interposed between a surface on said mounting means and said transparency.

4. A camera as defined in claim 2 wherein said resilient means is interposed between said holding means and said mounting means.

5. A camera as defined in claim 3 wherein said means for pivoting comprises a spring means biasing said mounting means to move said transparency to said inoperative position.

6. A camera as defined in claim 5 wherein said holding means comprises a solenoid.

7. A camera as defined in claim 4 further comprising a light trap positioned in said camera to prevent light entering said camera from reflecting from said transparency onto said film when said transparency is in inoperative position.

8. A photographic device comprising a camera, means for mounting a film in said camera, means for mounting a transparency in said camera for movement between an operative position in substantially intimate contact with said film and an inoperative position clear of said film, a reflecting mask positioned in front of said camera, an aperture in said mask, means for directing light against said mask for reflection into said camera to expose said film and means for directing light through said aperture to expose said film.

9. A photography method comprising placing a transparency in intimate contact with a film in a camera, backlighting an object to expose said film through said transparency with the exception of the areas silhouetted by said object when backlit, thereafter rapidly positioning a non-reflecting backdrop which is synchronized with the shutter of said camera behind said object and moving said transparency to an inoperative position clear of said film, frontlighting said subject to properly expose said area previously silhouetted by said object thereby to produce a picture incorporating said object into the environment provided by scenery on said transparency.

10. A photography method comprising placing a transparency into intimate contact with a film in a camera, arranging a reflecting mask having an aperture therein in front of said camera, directing light onto said reflecting mask and back into said camera while simultaneously backlighting an object to be photographed and projecting the silhouette of said object through said aperture into said camera whereby reflected light from said mask and light passing through said aperture expose said film through said transparency with the exception of the area covered by said silhouette thereafter positioning a backdrop behind said object and moving said transparency to a position clear of said film, frontlighting said object to properly expose said area previously silhouetted by said object thereby to provide a picture incorporating said object into said environment provided by scenery on said transparency.

11. A photographic device comprising a camera, means for mounting a film in said camera, means for mounting a transparency in said camera for movement between an operative position in substantially intimate contact with said film in an inoperative position clear of said film, means for supporting an object to be photographed, backlighting means to backlight said object, a backdrop and frontlighting means, means to operate said backdrop when said backlighting means is actuated and means to operate said frontlighting means when said backdrop is in an operative position.

12. A device as defined in claim 11 wherein said means for supporting comprises a reflecting surface.

13. A device as defined in claim 11 wherein said means for supporting comprises a transparent surface.

* * * * *